United States Patent [19]

Schultheis et al.

[11] Patent Number: 5,087,370

[45] Date of Patent: Feb. 11, 1992

[54] METHOD AND APPARATUS TO DETOXIFY AQUEOUS BASED HAZARDOUS WASTE

[75] Inventors: Alexander Schultheis, Wrentham; Mark A. Landrigan, Concord, both of Mass.; Arun Lakhani, Audubon, Pa.

[73] Assignee: Clean Harbors, Inc., Quincy, Mass.

[21] Appl. No.: 623,604

[22] Filed: Dec. 7, 1990

[51] Int. Cl.$^5$ .................. B01D 59/28; B01D 61/00
[52] U.S. Cl. .................. 210/638; 210/684; 210/688; 210/195.2; 210/198.1; 210/257.2
[58] Field of Search .............. 210/634, 638, 639, 641, 210/644, 649–652, 683, 684, 688, 749, 195.2, 198.1, 199, 200–203, 205, 206, 209, 1, 257.2, 259, 260, 702, 696, 698

[56] References Cited

U.S. PATENT DOCUMENTS

| | | | |
|---|---|---|---|
| 3,882,018 | 5/1975 | Depree | 210/20 |
| 3,898,042 | 8/1975 | Webb et al. | 23/230 R |
| 3,931,007 | 1/1976 | Sugano et al. | 210/50 |
| 3,997,439 | 12/1976 | Ayukawa | 210/50 |
| 4,053,553 | 10/1977 | Reinhardt et al. | 423/105 |
| 4,066,542 | 1/1978 | Ayukawa | 210/51 |
| 4,097,377 | 6/1978 | Ayukawa | 210/50 |
| 4,120,780 | 10/1978 | Morimoto et al. | 208/211 |
| 4,151,077 | 4/1979 | Nogueira et al. | 210/21 |
| 4,193,854 | 3/1980 | Drnevich et al. | 204/149 |
| 4,256,587 | 3/1981 | Carnahan et al. | 210/670 |
| 4,256,630 | 3/1981 | Fremont | 260/112 R |
| 4,329,224 | 5/1982 | Kim | 210/709 |
| 4,338,199 | 7/1982 | Modell | 210/721 |
| 4,362,629 | 12/1982 | Senda et al. | 210/714 |
| 4,395,367 | 7/1983 | Rohrmann et al. | 252/629 |
| 4,486,391 | 12/1984 | Hashimoto | 423/9 |
| 4,543,190 | 9/1985 | Modell | 210/721 |
| 4,549,966 | 10/1985 | Beall | 210/661 |
| 4,578,195 | 3/1986 | Moore et al. | 210/679 |
| 4,737,315 | 4/1988 | Suzuki et al. | 252/632 |
| 4,741,831 | 5/1988 | Grinstead | 210/638 |
| 4,765,257 | 8/1988 | Abrishamian et al. | 110/342 |
| 4,765,834 | 8/1988 | Ananthapadmanabhan et al. | 75/108 |
| 4,770,780 | 9/1988 | Moses | 210/634 |
| 4,781,841 | 11/1988 | Someya | 210/747 |
| 4,820,647 | 4/1989 | Gibbons | 436/79 |
| 4,822,497 | 4/1989 | Hong et al. | 210/721 |
| 4,848,918 | 7/1989 | Kingsley et al. | 366/262 |
| 4,863,580 | 9/1989 | Epner | 204/269 |
| 4,872,993 | 10/1989 | Harrison | 210/666 |
| 4,877,530 | 10/1989 | Moses | 210/511 |
| 4,882,067 | 11/1989 | Johnson et al. | 210/688 |
| 4,888,053 | 12/1989 | Grayson et al. | 75/101 R |
| 4,888,098 | 12/1989 | Nyberg et al. | 204/1 R |

Primary Examiner—Frank Sever
Attorney, Agent, or Firm—Weingarten, Schurgin Gagnebin & Hayes

[57] ABSTRACT

A process and apparatus is provided in which aqueous based wastes are processed to remove solids, decant phase separated product, optimize chemically for solvent specific extraction, remove toxic metals and organics via solvent extraction and remove residual metals and organics via flocculation/filtration and adsorption with activated carbon. The system employs chemical optimization of the aqueous waste stream by the addition of reagents to optimize subsequent treatment and the addition of chelating agents which inhibit the precipitation of heavy metals so that they are maintained in the waste stream as an organometallic complex which can be extracted via carbon dioxide extraction and concentrated for recovery, recycling or final disposal.

43 Claims, 4 Drawing Sheets

METHOD AND APPARATUS TO DETOXIFY AQUEOUS BASED HAZARDOUS WASTE

FIELD OF THE INVENTION

The present invention relates to a process and apparatus for hazardous waste processing, and in particular to a Process and apparatus for detoxifying aqueous based hazardous wastes.

BACKGROUND OF THE INVENTION

Typically, organic hazardous waste streams are incinerated at approved Hazardous Waste Facilities. When the waste streams comprise primarily water and the BTU content falls to less than 5,000 BTU per pound of waste, alternative treatment technologies become economically viable.

Systems are known for processing hazardous wastes to remove organic pollutants therefrom. Examples of such systems are described, respectively, in U.S. Pat. No. 4,349,415 and U.S. Pat. No. 4,375,387. Organic extraction such as described in these patents uses carbon dioxide flowing upwardly in a column countercurrent to a stream of liquid hazardous waste, as a solvent to strip organics from the waste matrix. At or near its critical point the carbon dioxide behaves like a liquid organic solvent in that it dissolves organic substances in the waste stream, and it behaves like a gas in that its extraction rate is higher than the separation that might be obtained by other means. The organics laden carbon dioxide or extract is removed from the top of the column, while "clean" water is drawn off at the bottom. The organics laden extract is transported to a separator wherein the temperature and pressure are lowered. The organics separate from the carbon dioxide solvent and are recovered in a concentrated form while the carbon dioxide solvent is recycled to the extraction column.

A hazardous waste matrix typically contains heavy metals, along with a variety of organics such as ketones, alcohols, acetates, and aromatic and aliphatic hydrocarbons. Critical fluid extraction as described in the aforesaid patents efficaciously removes organics in aqueous based hazardous wastes, however, the "clean" water drawn off after extraction, is likely to contain toxic heavy metal components.

Processes are known for removing heavy metals from waste water streams. U.S. Pat. No. 4,166,032 describes a system in which heavy metals are separated from the waste water stream by contacting the waste water with a fibrous metal base cellulose xanthate substrate. After the heavy metals are chemisorbed onto the adsorbent cellulose xanthate, the substrate must be separated from the waste water to permit stripping of the heavy metals therefrom. The cellulose xanthate may be removed from the waste water by sedimentation, centrifugation or filtration. Alternatively, a porous bed of cellulose xanthate may be established in a flowthrough contacting reactor.

U.S. Pat. No. 4,342,650 describes a method for converting substantially untreated sludge into useful substances. The treatment involves a chelating step in which heavy metals are removed from suspension and recovered as a recyclable concentrate. The '650 patent describes a chelation process resulting from preliminary steps of disintegration and enzyme hydrolysis which produces a low molecular weight slurry wherein the metal ion content is readily accessible and upon which chelation is effected.

The processes and apparatus known in the art do not concurrently process organics and heavy metals. A process such as described in the '415 and '387 patents only removes organics from the hazardous waste stream. The '032 Patent requires the introduction, removal and further processing of cellulose xanthate adsorbent in the contact removal of only heavy metals in a waste stream. The '650 patent requires significant and costly disintegration and enzyme hydrolysis preprocessing in the chelation process which removes only heavy metals from waste slurry.

SUMMARY OF THE INVENTION

The present invention comprises a method and apparatus for detoxifying aqueous based hazardous wastes which incorporates a combination of process technologies that effect the concurrent removal of a variety of organics and the removal of heavy metals.

According to the invention a process and apparatus is provided in which aqueous based wastes are processed by removing solids, decanting phase separated product, optimizing chemically for carbon dioxide extraction, removing toxic metals and organics via liquified carbon dioxide extraction, and removing residual metals and organics via flocculation/filtration and activated carbon adsorption. The process of chemically optimizing the aqueous waste stream includes the addition of chemicals to optimize subsequent treatment and chelating agents to inhibit the precipitation of heavy metals so that they are maintained in the waste stream as an organometallic complex which can be extracted via carbon dioxide extraction and concentrated for final disposal or recycling.

Features of the invention include the use of relatively inexpensive carbon dioxide as a solvent for disengaging both organics and heavy metals from the waste stream. The use of carbon dioxide as a solvent also allows for highly efficient and economic recycling of the solvent for reuse in the system.

DESCRIPTION OF THE DRAWING

These and other features and advantages of the present invention will become more apparent in light of the following detailed description of an illustrative embodiment thereof, as illustrated in the accompanying drawings, of which.

DETAILED DESCRIPTION

Figure 1:
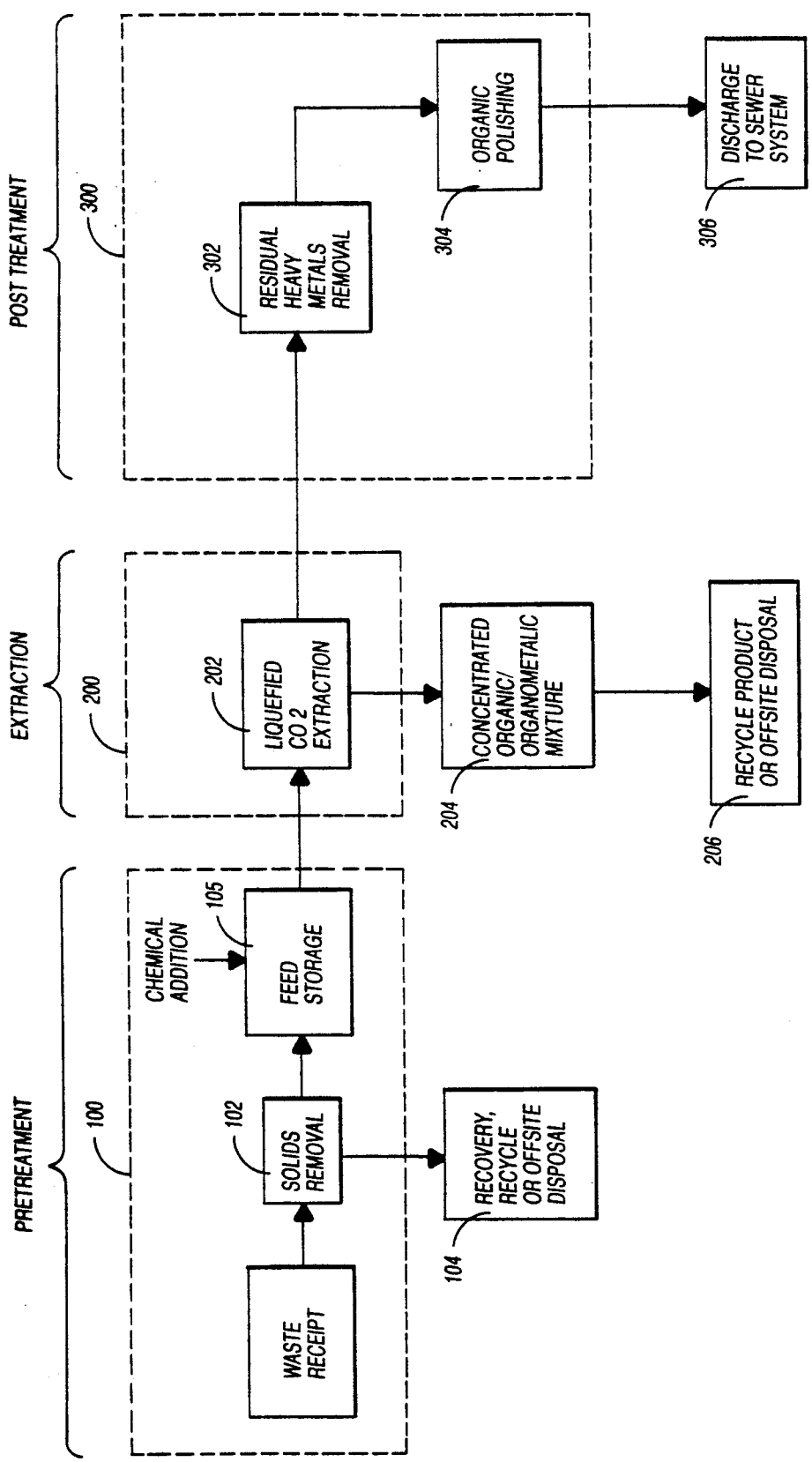
FIG. 1 is a block diagram of a process and apparatus for aqueous based waste processing according to the invention.

A process and apparatus for processing aqueous based hazardous wastes according to the invention, as illustrated in FIG. 1 comprises waste pretreatment 100, liquified carbon dioxide extraction 200, and post-treatment or polishing 300.

Waste received in the process is subject to pretreatment 100 which comprises the removal of solids 102 from the waste, as solids are not compatible with the process and apparatus according to the invention. Subsequent to removal the solids may be dried and readied for off-site disposal 104. An aqueous waste stream is transported to storage facilities 105 for storage, decanting, chemical treating and for establishing a feed for downstream extraction 200 and post-treatment polishing functions 300.

The aqueous waste stream is fed from storage facilities to the extraction facility 200, which comprises liquified carbon dioxide extraction apparatus 202. The waste stream, having been chemically treated with chelating agents to be discussed hereinafter, has heavy metals suspended therein as chelates, in addition to organic components. The liquified carbon dioxide extraction 202 produces a "dirty" liquid carbon dioxide from which a concentrated organic/organometallic chelate mixture 204 is produced for further processing, recycling or off site disposal 206. A refined aqueous stream or raffinate also exits the liquid carbon dioxide extraction process 202. However, the "clean" aqueous stream may contain residual heavy metals that were not removed via carbon dioxide extraction and which are further processed in post-treatment 300.

Post-treatment/polishing 300 involves the removal of residual heavy metals 302 in the aqueous stream by adding chemicals to the stream to facilitate flocculation and/or precipitation of the residual metals for removal by filtration, centrifugation or other processes known in the art. The aqueous stream is then subjected to an organics polishing step 304 wherein any residual toxic organics are removed from the stream prior to discharging 306 the effluent from the process.

Figure 2:
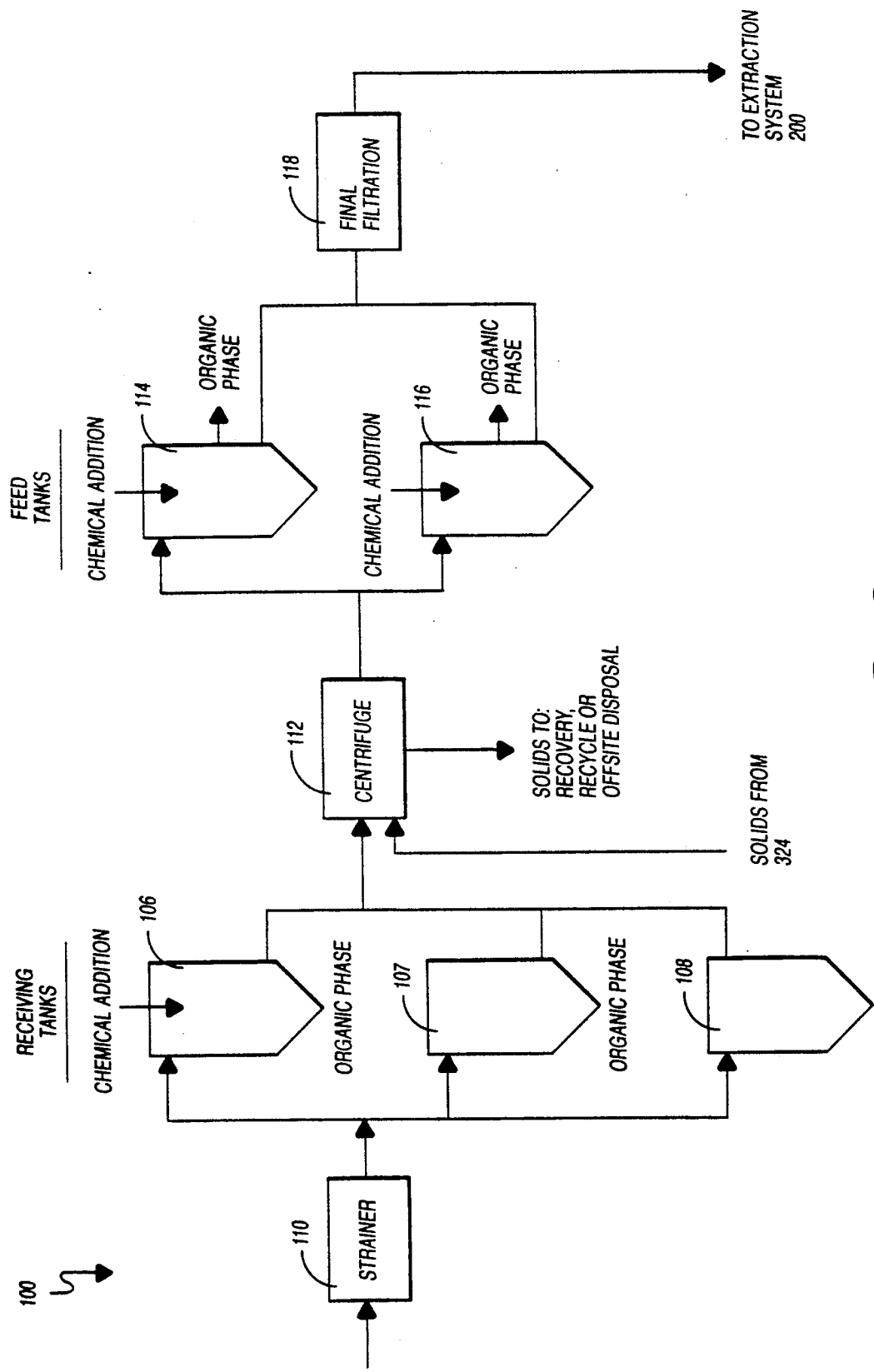
FIG. 2 is a block diagram representation of a pretreatment sub-system in the process and apparatus of FIG. 1.
Figure 3:
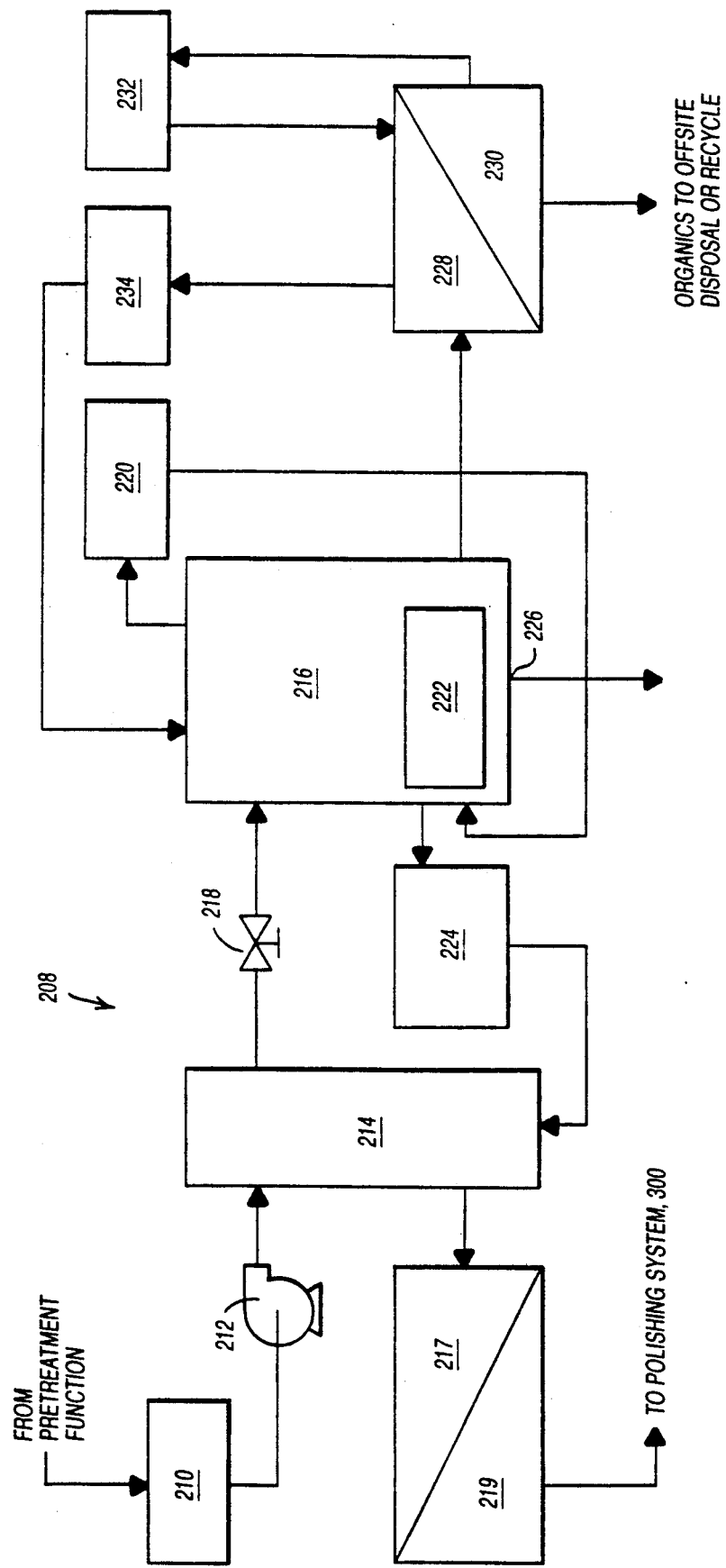
FIG. 3 is a block diagram of a liquified carbon dioxide extraction system in the process and apparatus of FIG. 1.

Referring now to FIG. 2, pretreatment 100 is effected in a series of tanks which receive the hazardous waste and in which the waste is prepared for processing. A first set of three tanks 106, 107, and 108 serve as receiving tanks for initially storing wastes received through a strainer 110 which eliminates large solids from the waste stream. Physical phase separation and feed pretreatment are initiated in tanks 106, 107 and 108 as described hereinafter. Downline from the receiving tanks 106, 107, 108 is a mechanical solids separation system 112 comprising a centrifugal separation system such as a bowl type centrifuge, which centrifugally separates solids from the waste stream.

A second set of two tanks 114, 116 receives the waste stream from the centrifuge 112 and serves the dual function of storing waste for physical phase separation and solids settling and of providing a feed for further processing. Depending upon the composition of the waste stream, solids settling and pretreatment is further facilitated by the addition of chemicals, acids, bases, oxidizing and reducing agents, and polymers to enhance solids settling and separation or break emulsion layers to effect a relatively solids free aqueous waste stream compatible for processing according to the invention.

Also in the second tank set 114, 116 a feed is established for further processing. Chemicals are added to optimize the waste stream. By optimizing the pH of the process feed, downstream extraction may be enhanced. Chelating agents are added to complex the heavy metals in the waste stream so that they can be removed by the downstream carbon dioxide extraction. The chemicals added for process feed optimization will depend on the particular composition of the hazardous waste matrix.

According to the invention, specific waste streams may contain variable concentrations of heavy metals, such as chromium. Treating such a waste stream resident in feed tank set 114, 116 by chemical chelation, as with ammonium pyrrolidine dithiocarbamate (APDC) at an appropriate pH, results in a suspended organometallic chelate which is extracted with the liquified carbon dioxide, removing it from the waste stream. Such chelation chemistry is substantially in accordance with the example hereinafter.

The following examples are set forth solely for the purpose of further demonstrating the process and apparatus according to the invention and not for the purpose of limiting same.

EXAMPLES

EXAMPLE 1

Ammonium Pyrrolidine Dithiocarbamate (APDC)-Chromium Chelate Equilibrium Extraction Data Extraction Conditions:
Solvent, Carbon Dioxide @ 1000 psi
25° C.
Solvent to Feed Ratio, 1:1
One Stage Extraction

| Sample No. | Initial Concentr. Chromium | Final Concentr. Chromium | D.C. (1) | % APDC | pH |
|---|---|---|---|---|---|
| 1 | 100 mg/L | 22 mg/L | 3.5 | 0.2 | 3.5 |
| 2 | 50 mg/L | 1.6 mg/L | 30.3 | 0.6 | 3.5 |
| 3 | 50 mg/L | 14 mg/L | 2.6 | 0.2 | 3.8 |
| 4 | 50 mg/L | 9.1 mg/L | 4.5 | 0.6 | 7.0 |

(1) D.C., Distribution Coefficient, Expression of the equilibrium concentration of analyte present in the solvent phase divided by the equilibrium concentration of analyte present in the aqueous phase.

EXAMPLE 2

Other Heavy Metals Extracted with APDC and Liquified $CO_2$

Extraction Conditions:
Solvent, Carbon Dioxide @ 1000 psi
25° C.
Solvent to Feed Ratio, 1:1
pH 3.0
APDC @ 0.1%

| Metal | Initial Concentration | Final Concentration |
|---|---|---|
| Cadmium | 68.5 mg/L | 17.5 mg/L |
| Copper | 44.6 mg/L | 24.1 mg/L |
| Lead | 11.9 mg/L | 9.30 mg/L |
| Nickel | 61.6 mg/L | 17.0 mg/L |
| Zinc | 66.6 mg/L | 16.9 mg/L |

The chemically treated waste stream, having had solids removed therefrom, is filtered through strainers, sieves, screens or fabric filters 118 to provide final protection to downstream pumping equipment. The waste is passed out of pretreatment 100 to be processed in the liquified carbon dioxide extraction function 200. The extraction function comprises an extraction unit 208 in which liquid carbon dioxide is used as a solvent to strip organics and heavy metals, in the illustrative example chromium, from the waste stream. Aqueous waste from the pretreatment 100 is pumped to a feed drum 210 of the extraction system 208. A feed pump 212 delivers the waste to the top of an extraction column 214. The extraction column 214 is a pressurized vessel which has a series of sieve tray downspouts through which the organics and heavy metals laden aqueous stream flows downwardly. Liquid carbon dioxide is fed into the bottom of the extraction column 214 and flows countercurrent to the waste stream. The liquid carbon dioxide, which has a lower density than water, is dispersed by the perforations in the sieve trays as it jets upwardly. During the countercurrent contact of the carbon dioxide with the waste stream, the liquified carbon dioxide acts as a high solubility solvent dissolving the organic-/organometallic chelate from the waste stream. Refined waste or raffinate, having had organics and heavy metals removed exits the extraction column near the bottom thereof and is depressurized through medium pressure vessel 217 and low pressure vessel 219 for delivery to post-treatment 300, discussed hereinafter. A carbon dioxide/organic/organometallic chelate extract exits the top of the extraction column 214 and flows to a solvent recovery column or vessel 216.

The liquified carbon dioxide/organic/organometallic extract flows from the extraction column 214 into the solvent recovery column 216 and to the bottom thereof. A heat exchanger 222 utilizes recoverable heat from carbon dioxide recompression to heat and vaporize the liquified carbon dioxide in the recovery column 216, resulting in separation of carbon dioxide from an organic/organometallic chelate mixture. The organic/organometallic chelate mixture exits the bottom 226 of the solvent recovery column 216, whereas vaporized carbon dioxide exits the top of the column 216 for recompression in a main compressor 220. Hot recompressed carbon dioxide is passed through the heat exchanger 222 to provide the necessary heat for the solvent recovery system. A condenser 224 further cools the recycled liquified carbon dioxide prior to reuse in the extraction column 214, to act as a solvent, as discussed hereinbefore.

The concentrated organic/organometallic chelate mixture flows from the recovery column 216 to a medium pressure vessel 228 and a low pressure vessel 230 for depressurization. Residual carbon dioxide in the stream may be vaporized and recycled back to the solvent recovery column 216 after being recompressed through a low pressure compressor 232 and a medium pressure compressor 234 connected to medium pressure vessel 228. Organic/organometallic chelate mixture exits the bottom of the low pressure vessel 230 to storage tanks (not shown) for further processing, off-site disposal or recycling.

Figure 4:
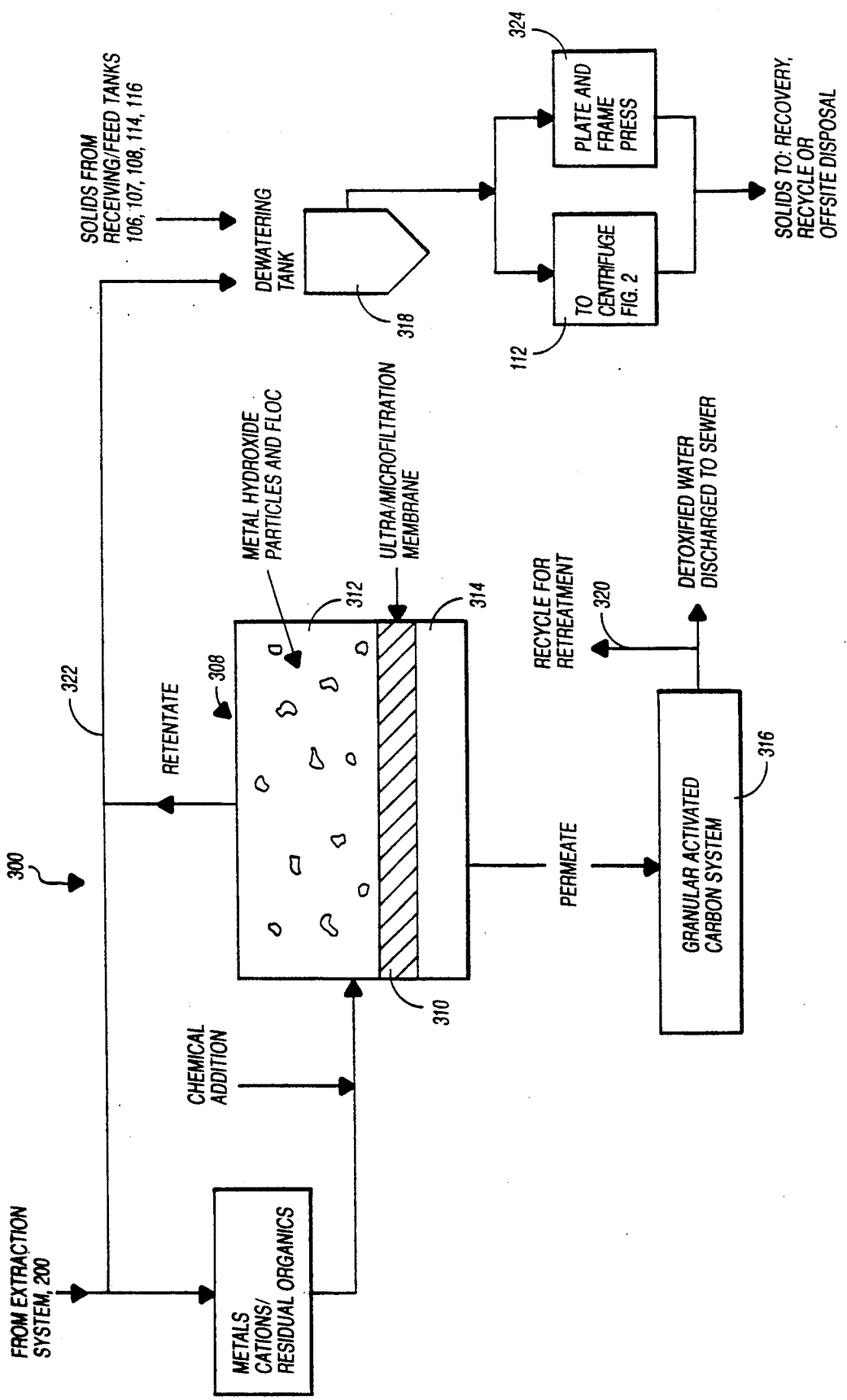
FIG. 4 is a diagrammatic representation of a post-treatment sub-system in the process and apparatus of FIG. 1.

Referring now to FIG. 4, the aqueous effluent (raffinate) from the extraction function 200 enters post treatment and is treated as required to remove residual heavy metals and organics. The post treatment required is significantly downsized due to the effects of the chelation/extraction process. The raffinate is typically treated with caustic, to adjust the pH to approximately 10. This promotes the formation of hydroxides with the metallic cations to form metal hydroxide precipitates that can be removed with a filtration system. Sodium sulfide can also be added to form a sulfide precipitate, as well as a variety of polymers which which can be added to aid in the formation of particles for subsequent treatment. Further, high molecular weight chelating agents may be added to form macromolecular complexes that can be removed by filtration.

Metal hydroxide and floc laden raffinate is processed in an ultrafiltration or microfiltration system 308, depending on membrane pore size requirements. The ultra/micro filtration system 308 circulates precipitated and flocculated raffinate to an ultra/micro filtration membrane 310. The membrane 310 passes water and unprecipitated ions, such as sodium, calcium, nitrate etc., through the membrane 310 as permeate, concentrating the heavy metal hydroxides and other suspended particle on a retentate side 312 of the membrane 310. The permeate, passing through the membrane to a permeate side 314 of the filtration system 308, is passed to a granular activated carbon system 316. The granular activated carbon adsorbs any residual toxic organics that may be present in the permeate. Subsequently, fully processed effluent or detoxified water is discharged.

The hydroxide precipitates and other suspended particles or retentate that remains on the retentate side 312 of the filtration system 308 is monitored. When the retentate reaches a certain suspended solids concentration level, the slurry is passed to a solids dewatering tank 318. The dewatering tank 318 may also receive solids which settle out in the receiving tank set 106, 107, 108 and the feed tank set 114, 116. The hydroxide sludge and solids settle further and thicken in the dewatering tank 318. Further dewatering of the slurry is accomplished by processing with the centrifuge 112 (FIG. 2) or with a plate and frame filter press 324. Aqueous filtrates are recycled through the system as treatment requirements dictate.

One of ordinary skill in the art can appreciate that it is desirable to have various recycle loops incorporated in the aqueous waste processing apparatus according to the invention, such as lines 320 and 322 illustrated in FIG. 4, so that the waste stream can be rerouted and reprocessed at certain stages if treatment goals are not obtained.

Although six tanks are disclosed herein for functions including receiving, separating, feeding and thickening waste, it should be appreciated that more or fewer tanks can be employed and that the tanks and interconnections can be reconfigured to accommodate the various functions.

While strainers, sieves, bag filters, screens and centrifuges are described for physical solids separation herein, one of ordinary skill in the art will appreciate that various other means of physical separation, such as fabric or yarn wound filters and/or gravity sedimentation or floatation techniques known in the art can be used to effect the solids free aqueous based waste stream for processing according to the invention.

Further, although solids separation is discussed in the context of pretreatment, it will be appreciated that additional solids removal can be incorporated within the process, such as by the presence of filtration and screening devices located throughout the interconnecting piping.

It should be appreciated by one of ordinary skill in the art that the particular reagent to be added in the process feed tanks will depend on the metal or metals to be chelated. Further, while the reagents and optimizing chemicals are added herein in the feed tanks, chemical addition and feed optimization can take place in various process locations prior to extraction.

While residual metals and organics removal are effected by liquified carbon dioxide extraction and activated carbon adsorption, it will be appreciated that other solvents could be used to effect removal.

Although the invention has been shown and described with respect to an illustrative embodiment thereof, it should be understood by those skilled in the art that the foregoing and various other changes and additions in the form and detail thereof may be made without departing from the spirit and scope of the invention as delineated in the claims.

What is claimed is:

1. Apparatus for processing aqueous waste wherein said waste comprises a plurality of solid components and an aqueous component including organics and heavy metals, comprising:
   means for substantially concurrently removing at least some organics and at least some heavy metals from said aqueous waste, including,
   means for receiving said waste, and including a first means for removing at least one of said plurality of solid components from said waste;
   a plurality of storage means for holding said waste, at least some of said plurality of storage means receiving said waste from said means for receiving, at least one of said plurality of storage means being for storing said waste and at least one of said plurality of storage means being for phase separating a second one of said plurality of solid components and establishing an aqueous stream comprising said at least some organics and said at least some heavy metals;
   extraction means for contacting said aqueous stream with a solvent, said solvent dissolving some of said at least some heavy metals from said aqueous stream to form an extract comprising said solvent, some of said at least some organics and some of said at least some heavy metals; and
   recovery means for processing said extract, recovering said solvent therefrom and generating a concentrate comprising some of said at least some organics and some of said at least some heavy metals and generating a clean aqueous stream.

2. The apparatus of claim 1 further comprising a second means for removing at least one of said plurality of solid components, said second means for removing being disposed and functioning intermediate to said at least one of said plurality of storage means being for storing said waste and said at least one other of said plurality of storage means being for phase separating.

3. The apparatus of claim 2 wherein said second means for removing comprises a centrifuge.

4. The apparatus of claim 1 further comprising means for adding at least one chemical to said aqueous stream.

5. The apparatus of claim 4 wherein said at least one chemical is a chelating agent which reacts with some of said at least some heavy metals to form an organometallic complex which is maintained in said aqueous stream.

6. The apparatus of claim 5 wherein said extraction means comprises a column in which liquid carbon dioxide acts as said solvent and is contacted with said aqueous stream removing at least some of said at least some organics and said organometallic complex from said aqueous stream.

7. The apparatus of claim 6 wherein said at least some heavy metals are metals from the group consisting of chromium, cadmium, copper, lead, nickel and zinc.

8. The apparatus of claim 6 wherein said recovery means comprises pressure reduction means to decompress said extract and means to heat said extract to liberate said solvent therefrom and at least one compressor to recompress said solvent for recycling.

9. The apparatus of claim 5 wherein said chelating agent is ammonium pyrrolidine dithiocarbamate.

10. The apparatus of claim 1 further comprising a third means for removing at least one of said plurality of solid components, said third means for removing being disposed intermediate to said at least one other of said plurality of storage means being for phase separating and said extraction means, said third means for removing functioning to remove at least one of said plurality of solid components from said aqueous stream.

11. The apparatus of claim 10 wherein said third means for removing comprises a filter.

12. The apparatus of claim 1 further comprising polishing means for receiving said clean aqueous stream and removing residual heavy metals and residual organics therefrom.

13. The apparatus of claim 12 wherein said polishing means comprises:
   means for adding chemicals to said clean aqueous stream to generate a flocculent comprising said residual heavy metals;
   first filtering means for separating said flocculent from said clean aqueous stream; and
   second filtering means for separating said residual organics from said clean aqueous stream.

14. The apparatus of claim 13 wherein said first filtering means comprises an ultrafiltration system including an ultrafiltration membrane.

15. The apparatus of claim 13 wherein said first filtering means comprises a microfiltration system including a microfiltration membrane.

16. The apparatus of claim 13 wherein said second filtering means comprises an activated carbon adsorption filtration system.

17. The apparatus of claim 1 further comprising a fourth means for removing at least one of said plurality of solid components, wherein said fourth means for removing comprises a plurality of filtering means disposed in a series of means for connecting said means for receiving, said plurality of tanks, said extraction means and said recovery means.

18. The apparatus of claim 1 wherein said recovery means comprises means for recycling said solvent back to said extraction means.

19. A process comprising:
   substantially concurrently removing organics and heavy metals from an aqueous based stream, by,
   removing solids from said aqueous based stream;
   storing said aqueous based stream;
   adding a chelating agent to said aqueous based stream to generate an organometallic complex comprising at least some of said heavy metals;
   dissolving some of said organics and said organometallic complex in a solvent;
   separating an extract from said aqueous based stream, said extract comprising said solvent, said organometallic complex, at least some of said organics and at lest some of said heavy metals to generate a clean aqueous stream; and
   recovering said solvent from said extract.

20. The process of claim 19 further comprising a step of:
   recycling said solvent.

21. The process of claim 19 wherein said step of removing solids is effected using a centrifugal separation apparatus and at least one filter.

22. The process of claim 19 wherein said step of storing said aqueous based stream involves storing said stream in a plurality of tanks.

23. The process of claim 19 wherein the step of adding a chelating agent to said aqueous based stream comprises adding ammonium pyrrolidine dithiocarbamate to the aqueous based stream prior to said step of extracting.

24. The process of claim 19 wherein said solvent is admixed with said aqueous based stream by dispersing said solvent in a column countercurrent to flow of said aqueous based stream.

25. The process of claim 19 wherein the step of dissolving some of said organics and said organometallic complex in a solvent comprises admixing said aqueous based stream with liquified carbon dioxide.

26. The process of claim 19 further comprising a step of:
polishing said clean aqueous stream to remove residual organics and residual heavy metals therefrom.

27. The process of claim 26 wherein said step of polishing comprises:
adding chemicals to said clean aqueous stream to generate a flocculent comprising said residual heavy metals;
removing said flocculent from said clean aqueous stream;
passing said clean aqueous stream through an activated carbon system to remove said residual organics therefrom.

28. The process of claim 27 wherein the step of removing said flocculent from said clean aqueous stream comprises passing said clean aqueous stream through a filtration system.

29. The process of claim 28 wherein said filtration system comprises an ultrafiltration membrane.

30. The process of claim 28 wherein said filtration system comprises a microfiltration membrane.

31. The process of claim 19 wherein said step of recovering said solvent from said extract comprises the steps of:
promoting distillation of said solvent to generate a vaporized solvent, by applying heat to said extract;
recompressing said vaporized solvent to generate a liquid phase solvent;
exchanging heat, said heat being generated in said step of recompressing said vaporized solvent, from said vaporized solvent to said extract to effect said step of promoting distillation;
condensing said liquid phase solvent to cool said liquid phase solvent for use in said step of dissolving said organometallic complex.

32. A system comprising:
means for processing and substantially concurrently removing organics and heavy metals from aqueous based hazardous waste, including,
pretreatment means for removing solids from said aqueous based stream and for establishing an aqueous feed;
chelating means for chemically treating said aqueous feed and for chelating at least some of said heavy metals to maintain said at least some of said heavy metals in said aqueous feed as a suspended chelate;
extraction means for providing a solvent to dissolve and remove at least some of said organics and said suspended chelate from said aqueous feed as a concentrated extract and for providing an aqueous raffinate;
recycling means for stripping said solvent from said concentrated extract and for recycling said solvent back to said extraction means; and
post-treatment means for processing said aqueous raffinate to remove residual organics and heavy metals therefrom and for discharging an aqueous effluent.

33. The system of claim 32 wherein said pretreatment means comprises at least one means for storing said aqueous based hazardous waste and at least one means for separating solids from said aqueous based hazardous waste.

34. The system of claim 33 wherein said at least one means for storing said aqueous based hazardous waste comprises a plurality of storage tanks.

35. The system of claim 33 wherein said at least one means for separating solids from said aqueous based hazardous waste comprises a centrifugal separation apparatus.

36. The system of claim 32 wherein said pretreatment means comprises a means for adding at least one chemical to said aqueous based hazardous waste.

37. The system of claim 32 wherein said chelating means is ammonium pyrrolidine dithiocarbamate.

38. The system of claim 32 wherein said extraction means is a liquified carbon dioxide extraction system wherein said solvent is liquified carbon dioxide.

39. The system of claim 32 wherein said recycling means comprises a distillation means, a heat exchanger, a compressor and a condenser.

40. The system of claim 32 wherein said post-treatment means comprises:
means for adding at least one chemical to said aqueous raffinate, a first filtration system and a second filtration system, said first and second filtration systems being for processing said aqueous raffinate.

41. The system of claim 40 wherein said first filtration system comprises a microfiltration membrane.

42. The system of claim 40 wherein said first filtration system comprises an ultrafiltration membrane.

43. The system of claim 40 wherein said second filtration system is an activated carbon filtration system.

* * * * *